United States Patent [19]

Unterforsthuber et al.

[11] Patent Number: 5,054,811
[45] Date of Patent: Oct. 8, 1991

[54] ARRANGEMENT FOR AN AIRBAG GAS GENERATOR

[75] Inventors: Karl Unterforsthuber, Oberhaching; Karl-Heinz Sommer, Stockdorf, both of Fed. Rep. of Germany

[73] Assignee: Bayern-Chemie, Gesellschaft fur Flugchemische Antriebe mbH, Fed. Rep. of Germany

[21] Appl. No.: 526,704

[22] Filed: May 22, 1990

[30] Foreign Application Priority Data

Jun. 30, 1989 [DE] Fed. Rep. of Germany ....... 3921472
Jun. 30, 1989 [DE] Fed. Rep. of Germany ....... 3921473

[51] Int. Cl.⁵ .............................................. B60R 21/26
[52] U.S. Cl. .................................. 280/742; 102/530; 55/484; 55/217
[58] Field of Search ............... 280/728, 734, 735, 736, 280/737, 740, 741, 742; 102/530, 531; 222/3, 54; 422/164, 165, 166; 236/93 R; 55/343, 344, 384, 217

[56] References Cited

U.S. PATENT DOCUMENTS 3,324,656  6/1967  Bradshaw ........................ 137/79
3,897,962  8/1975  Sack ................................. 280/736
4,380,346  4/1983  Davis et al. ...................... 280/136

FOREIGN PATENT DOCUMENTS 373288   6/1990  European Pat. Off. ............ 280/736
2150744  5/1973  Fed. Rep. of Germany ...... 280/740
2518460  10/1975 Fed. Rep. of Germany .
3147780  9/1982  Fed. Rep. of Germany .
3733436  4/1988  Fed. Rep. of Germany .
229739   9/1989  Japan ................................. 280/736
317397   1/1972  U.S.S.R. ............................ 55/217

Primary Examiner—Richard A. Bertsch
Assistant Examiner—Karin Tyson
Attorney, Agent, or Firm—Evenson, Wands Edwards, Lenahan & McKeown

[57] ABSTRACT

An airbag gas generator is disclosed which includes a propellant chamber and a filter chamber arranged adjacent the propellant chamber for filtering flow of airbag propellant gas therethrough on its path to an airbag cushion. The filter chamber is provided with a plurality of alternative gas flow paths therethrough which have respective different filter resistances. Temperature dependent change-over devices are provided for controlling the flow of gas through the respective alternative gas flow paths in the filter chamber as a function of the ambient temperature at the generator.

23 Claims, 2 Drawing Sheets

5,054,811

ARRANGEMENT FOR AN AIRBAG GAS GENERATOR

BACKGROUND AND SUMMARY OF THE INVENTION

The invention relates to an arrangement for a gas generator of a motor vehicle occupant protection system which has a filter chamber connected to the propellant chamber and equipped with filters for the gas flow.

Gas generators for air cushions are known in multiple constructions in automotive engineering. U.S. Pat. No. 4 561 675 shows a gas generator housing in which the propellant chamber, by way of openings, is connected with the filter chamber surrounding it. In the case of an ignition of the propellant, the gas flow is forcibly led through the filters arranged in the filter chamber. There is no compensation of the burn-off characteristics of the propellant which are a function of the ambient temperature.

A gas generator has become known from the EP-0069 441 (corresponding to U.S. Pat. No. 4,380,346) in which the gas outlet openings of the propellant chamber are closed off by means of tear foils which open up the path of the gas flow through the filters to the air cushion only when a minimum pressure is reached. Particularly at low ambient temperatures, this results in a considerable delay of the inflating of the air cushion.

It is an object of the invention to develop a gas generator having a filter chamber in such a manner that the dependence on temperature of the gas production exercises a considerably reduced influence on an inflating of the air cushion which takes place in time and is operationally reliable.

According to the invention, this object is achieved by providing an arrangement at an airbag gas generator for the temperature-dependent change-over of the paths of the gas flow generated by a propellant in the area of the filter chamber.

In certain preferred embodiments, the propellant gas flow pressure acts on one or more valve members to control the gas flow through the filter chamber as a function of propellant gas pressure, which propellant gas pressure is dependent on ambient temperatures.

In certain preferred embodiments, a valve member is provided which melts at a certain predetermined temperature of the propellant gas flow thereby opening in response to the temperature of the propellant gas flow.

In certain preferred embodiments, the selective propellant gas flow is provided by an arrangement with a filter chamber connected to a propellant chamber by way of openings and equipped with filters for the gas flow, comprising:

a partition provided in the filter chamber which has at least one first opening and at least one second opening, the at least one second opening is covered by means of the filters which form a main path for the gas flow, and movable cover means for covering the at least one first opening, the characteristics of the material and dimensions of which movable cover means being selected to automatically close the at least one first opening above an adjustable threshold of the ambient temperature.

In certain preferred embodiments, the cover means is a cover member constructed of aluminum of preselected thickness.

Principal advantages of the invention include, on the one hand, that particularly in the case of low ambient temperatures, a higher operational reliability is achieved and, on the other hand, the amount of propellant may also be reduced. As a result, a lower peak pressure is reached at high ambient temperatures, whereby the operational reliability is increased because of the lower pressure load exercised on the housing and on the air cushion.

At the same time, because of the lower amount of propellant, the inherent weight of the gas generator is reduced and the amount of harmful substances generated during the burn-up is decreased.

Reference is made to related commonly assigned applications Ser. No. 07/541,954 filed June 22, 1990 (based on German Utility Model Application G 89 09 626.6, filed in Germany on Aug. 11, 1989) and Ser. No. 07/542,002, filed June 22, 1990 (based on German Patent Application P 39 24 500.4-21, filed in Germany on July 25, 1989).

Other objects, advantages and novel features of the present invention will become apparent from the following detailed description of the invention when considered in conjunction with the accompanying drawings

DETAILED DESCRIPTION OF THE DRAWINGS

Figure 1:
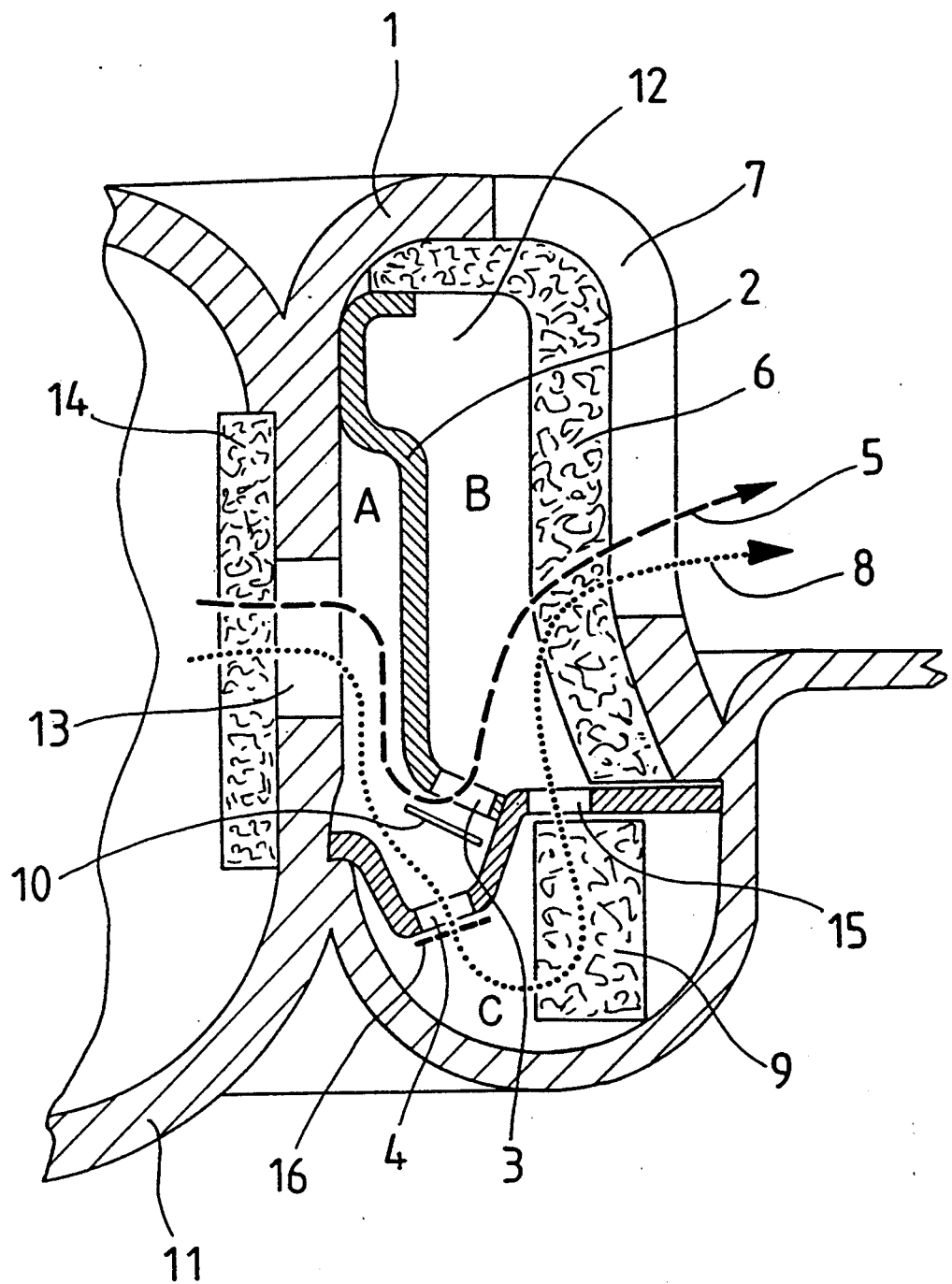
FIG. 1 is a schematic sectional view of a portion of a gas generator constructed according to a preferred embodiment of the present invention.

FIG. 1 of the drawing is a schematically simplified sectional view of an airbag gas generator, constructed in accordance with a first preferred embodiment of the invention. The housing 1 of the filter chamber 12 is connected with the housing 11 containing the gas-generating propellant by way of bores 13 which are covered by a sieve 14. By means of a partition 2 which has a branching in the embodiment, the filter chamber 12 is divided into different spaces A, B, C. The partition contains openings 3, 4, 15 which connect the spaces A, B, C with one another In the case of ambient temperatures below a selectable temperature threshold, for example 20° C., only the first opening 3 is open of the two openings through which the gas flow can leave space A. The gas flow 5 therefore takes the path 5 with the lower resistance, which is shown as an interrupted line, from space A to space B and there, through the first filter package 6 and through the blow-out opening 7, to the air cushion.

However, if the ambient temperature exceeds the selected temperature threshold T, either the higher temperature or the gas pressure of the propellant which is also higher at this higher temperature is used to permit the gas flow 8, which is shown by a dotted line, to take another path through the opening 4 into space C and there, through the additional filter package 9 and the opening 15, into space B from where, in turn, it reaches the blow-out opening 7 through the first filter package 6.

The closing of the opening 4 can be carried out in various ways in such a manner that the opening is always opened when a temperature threshold and/or a pressure threshold is exceeded. This may take place, for example, by using a meltable material, such as a metal or a plastic material, or by covering the opening by means of a tear foil (such as schematically depicted at 16 in FIG. 1). However, the partition 2 itself may also be provided with a predetermined breaking point which breaks when a certain pressure is exceeded. In addition, it is possible to close the opening 4 by means of a cover plate which rests on the outlet side of the opening in a springy manner and which, when a temperature threshold or pressure threshold is exceeded, opens up the path for the gas flow 8.

In this case, while the opening 4 is opened up, the gas flow 8 is guided through the additional filter package 9 and is therefore cooled more than on the path 5. As a result, the gas pressure delivered to the air cushion, when the ambient temperatures are high, falls considerably in comparison to a gas generator without that type of secondary path for the gas flow.

In addition, it may also be provided that the first opening 3 is equipped with a movable cover 10 which, above the opening temperature for the second opening 4, at least partially closes off the first opening 3 so that the gas flow is forced onto the secondary path 8. Concerning the functioning of such a cover 10, reference is made to the below described embodiment of FIG. 2 for corresponding cover 101.

Figure 2:
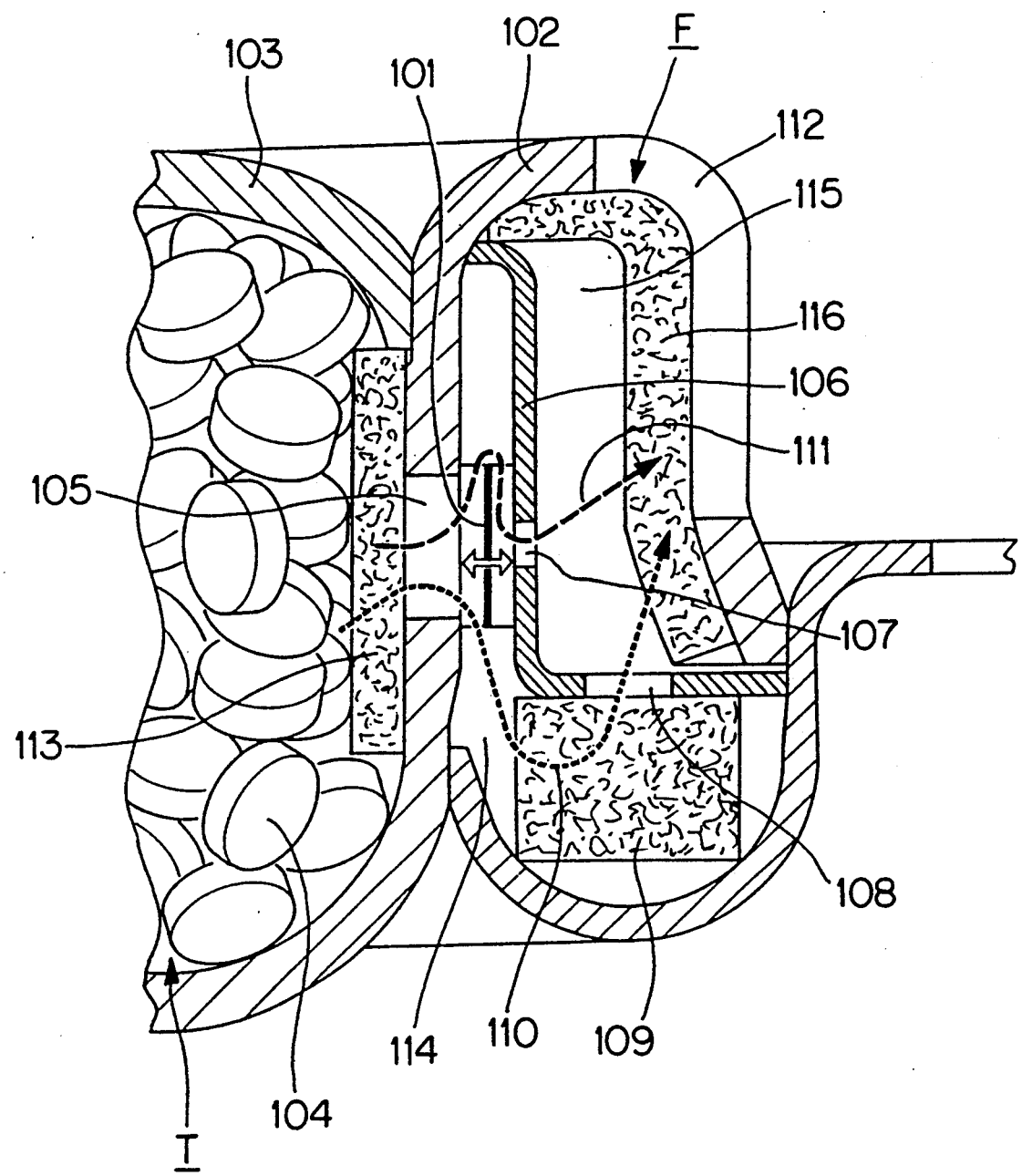
FIG. 2 is a schematic sectional view of a portion of a gas generator constructed according to another preferred embodiment of the invention.

FIG. 2 of the drawing is a schematically simplified sectional view of an airbag gas generator, constructed according to another preferred embodiment of the invention. The housing 102 of the filter chamber F is connected with the propellant housing 103 containing the gas-generating propellant 104. An opening 105 covered by a sieve 113 is provided for the gas flow from the propellant chamber T into the filter chamber F. The filter chamber F has a partition 106 which divides it into two spaces 114, 115 which are partitioned with respect to one another and of which one 114 is connected with the propellant chamber T by way of the opening 105, and the other one 115 is assigned to the blow-out opening 112 covered by means of a filter package 116.

The partition 106 has at least one first opening 107 and at least one second opening 108. The second opening 108 is completely covered by another filter package 109 and is used as the main path 110 for the gas flow as known from the state of the art.

The first opening 107 makes it possible that the gas flow, while bypassing the additional filter package 109, takes a secondary path 111 to the blow-out opening 112 with considerably less resistance.

On the side of the partition 106 facing the propellant chamber, the first opening 107 is covered by a movable cover 101 which, in the embodiment, is formed of a thin aluminum sheet. When dimensioning the cover, it is important that the cover, above a certain threshold of the gas pressure which depends on the ambient temperature, for example, at room temperature (approximately 20° C.), is so movable that it is pressed on the first opening 107 by the gas pressure generated by the propellant and closes this opening. At temperatures below the mentioned threshold, the gas pressure which is lower at low temperatures and the reduced mobility of the cover are not longer sufficient for closing the first opening.

The following is achieved by means of this temperature-dependent valve function of the first opening 107. The gas pressure is low when the temperatures of the operating range of the gas generator are low, i.e., in the range of −40° C. to approximately +20° C. For this reason, it should be avoided that this pressure is further reduced by the filtering and cooling process when the flow passes through the filters 109 which would make doubtful the operational reliability of the gas generator. The gas flow is therefore led on the secondary path 111, by way of the first opening 107 which is open at low temperatures, into the space 115 and is then led to the blow-out opening 112 through the additional filter package 116. This ensures an undelayed inflating of the air cushion. In the case of higher ambient temperatures, i.e., in the range of between +20° C. and +85° C., the first opening is closed off by the cover 101 according to the invention, and the gas flow moves along the main path 110 known per se through both filter packages 109, 116 to the blow-out opening 112. Thus, by means of the cover 101 and the characteristics of its material and its dimensioning, a reliable change-over of the gas flow paths is achieved at a predetermined temperature threshold.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An airbag gas generator arrangement comprising:
   a propellant chamber,
   a filter chamber arranged adjacent the propellant chamber for accommodating flow of airbag propellant gas therethrough to an airbag cushion, said filter chamber providing first and second alternative gas flow paths therethrough with said alternative gas flow paths having respective different filter resistances,
   and temperatures dependent change-over means for controlling the flow of gas via the first and second alternative gas flow paths as a function of ambient temperature at the generator.

2. An arrangement according to claim 1, wherein said change-over means includes gas flow pressure controlled valve means for closing off one of the first and second gas flow paths.

3. An arrangement according to claim 1, wherein said first gas flow path is a main gas flow path which includes more filter resistance than does the second gas flow path.

4. An arrangement according to claim 3, wherein said change-over means includes a secondary gas flow responsive valve means arranged in the second gas flow path.

5. An arrangement according to claim 3, wherein said change-over means includes a main gas flow responsive valve means in the main gas flow path.

6. An arrangement according to claim 5, wherein said gas flow responsive valve means is formed of a material which melts at a predetermined temperature.

7. An arrangement according to claim 5, wherein said gas flow responsive valve means is formed of a pressure responsive tear foil.

8. An arrangement according to claim 5, wherein said gas flow responsive valve means is formed as a predetermined breaking point in a partition in the filter chamber.

9. An arrangement according to claim 5, wherein said gas flow responsive valve means is closed by a springy cover.

10. An arrangement according to claim 5, wherein said change-over means includes a second gas flow responsive valve means arranged in the secondary gas flow path.

11. An arrangement according to claim 10, wherein said gas flow responsive valve means is formed of a material which melts at a predetermined temperature.

12. An arrangement according to claim 10, wherein said gas flow responsive valve means is formed of a pressure responsive tear foil.

13. An arrangement according to claim 10, wherein said gas flow responsive valve means is formed as a predetermined breaking point in a partition in the filter chamber.

14. An arrangement according to claim 10, wherein said gas flow responsive valve means is closed by a springy cover.

15. An arrangement for a gas generator of a motor vehicle occupant protection system which includes a filter chamber connected to the propellant chamber by way of openings and equipped with filters for the gas flow, comprising:
  a partition provided in the filter chamber which has at least one first opening and at least one second opening, the second opening being closed, and the first opening leading the gas flow to a first filter package and through this filter package to a blow-out opening leading to an air cushion,
  wherein the second opening is opened up when a temperature threshold and/or pressure threshold is exceeded, whereby the gas flow is guided through an additional filter package.

16. An arrangement for a gas generator according to claim 15, wherein the second opening is closed off by a material which melts at the temperature threshold.

17. An arrangement for a gas generator according to claim 15, wherein the second opening is closed off by a tear foil.

18. An arrangement for a gas generator according to claim 15, wherein the partition has a predetermined breaking point at the point of the second opening.

19. An arrangement for a gas generator according to claim 15, wherein the second opening is closed off by means of a springy cover on its outlet side.

20. An arrangement for a gas generator according to claim 15, wherein the first opening is closed off at least partially by means of a blocking device upon exceeding the temperature threshold and/or the pressure threshold.

21. An arrangement for a gas generator of a motor vehicle occupant protection system which includes a filter chamber connected to a propellant chamber by way of openings and equipped with filters for the gas flow, comprising:
  a partition provided in the filter chamber (F) which has at least one first opening and at least one second opening, the at least one second opening being covered by means of filters which form a main path for the gas flow, the at least one first opening providing a secondary path for the gas flow which has significantly less resistance than the main path,
  and movable cover means for covering the at least one first opening, the characteristics of the material and dimensions of which movable cover means being selected to automatically close the at least one first opening above an adjustable threshold of the ambient temperature.

22. An arrangement according to claim 21, wherein the movement of the movable cover means is controlled as a function of at least one of the pressure and the temperature of the gas flow.

23. An arrangement according to claim 21, wherein the cover consists of an aluminum sheet of a suitable wall thickness.

* * * * *